Aug. 12, 1947.  L. U. FRANKLIN  2,425,462
ALKYLATION OF HYDROCARBONS
Filed March 28, 1946
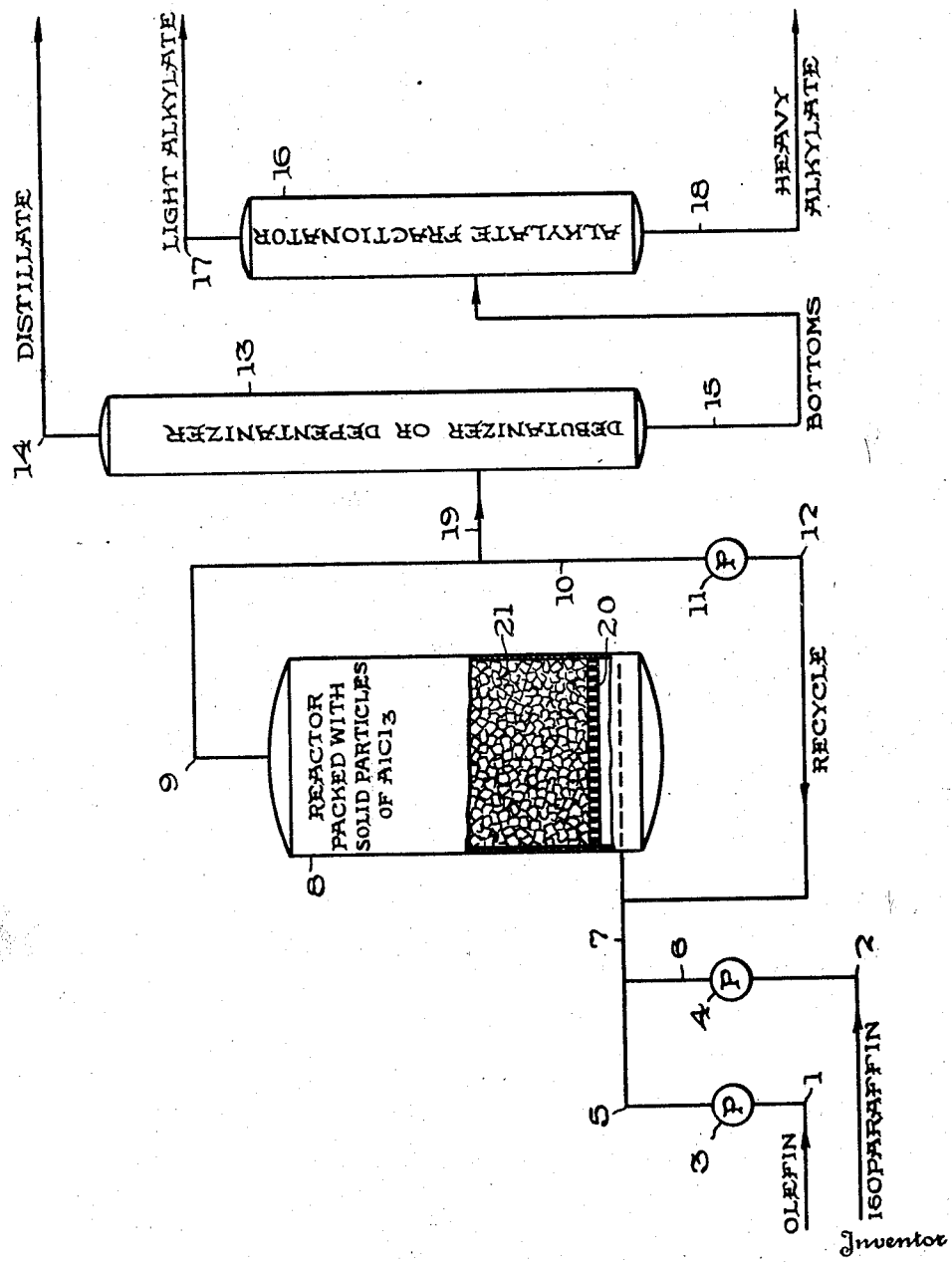
Inventor
Leslie U. Franklin
By G. M. Houghton
His Attorney Patented Aug. 12, 1947

2,425,462

UNITED STATES PATENT OFFICE 2,425,462

ALKYLATION OF HYDROCARBONS

Leslie U. Franklin, Port Arthur, Tex., assignor to Gulf Oil Corporation, Pittsburgh, Pa., a corporation of Pennsylvania Application March 28, 1946, Serial No. 657,834

3 Claims. (Cl. 260—683.4)

1

This invention relates to alkylation of hydrocarbons, and more particularly it relates to alkylation of hydrocarbons with the aid of anhydrous aluminum chloride as catalyst.

The alkylation of olefin hydrocarbons with isoparaffins is now a well established art and many proposals have been made for accomplishing it with the aid of anhydrous aluminum chloride. However, this material has many characteristics which limit its use as a catalyst or make its use prohibitively expensive. The use of aluminum chloride as a catalyst for hydrocarbon reactions generally has been restricted because of its reactivity, but this reactivity is not necessarily objectionable in the case of alkylation because the reaction product of anhydrous aluminum chloride and hydrocarbons—particularly olefins—is itself a very good catalyst for such alkylation.

The reaction product of anhydrous aluminum chloride and light hydrocarbons may vary greatly in physical properties. It may be a moderately viscous liquid or it may be a relatively hard solid, and the particular physical properties of this reaction product will control the adaptability of the material as a catalyst for alkylation. Highly fluid catalysts call for the use of much power for agitation of the catalyst and hydrocarbons to obtain the necessary contact of reactant hydrocarbons with the catalysts. The less fluid catalysts pose a substantially insuperable problem in trying to get adequate contact surface of catalyst to hydrocarbons. The catalyst in this case is much too thick to permit of its being stirred with the hydrocarbons in order to present extensive contact surface, while all efforts to use such material in the form of discrete particles is defeated because the particles will slough together into a cohesive mass.

Anhydrous aluminum chloride itself is a reasonably hard solid, and discrete pieces of the material may be built up into a porous bed. Efforts have been made to use such a bed of anhydrous aluminum chloride as a catalyst material but the invariable experience has been that very brief conduct of the alkylation process through such a bed converts the aluminum chloride to reaction products of such plasticity that they soon settle down into an impervious mass.

I have discovered and here present a method of alkylation of hydrocarbons in which I start out with a bed of discrete pieces of anhydrous aluminum chloride, to be used as catalyst, and through which catalyst bed I pass the hydrocarbons for alkylation under specific and carefully controlled conditions which avoid the production

2 of a plastic aluminum chloride reaction product, and by which I am enabled to maintain a hard and permeable catalyst bed throughout the life of the catalyst.

I have discovered that if the alkylation is conducted at a temperature within the approximate range of 50° F. to 75° F. with a contact time in the catalyst bed of from about one second to about ten seconds, while maintaining the olefin content in the feed stream within the approximate range of 0.1 per cent to 2.5 per cent, I can effect alkylation at a very satisfactory rate and maintain the catalyst bed firm and porous.

Temperatures in the lower part of the preferred range will permit a slight increase in the minimum reaction time and will also produce an alkylate containing a slightly higher proportion of primary reaction products. Temperatures in the higher portion of the preferred range tend to produce more rearranged or secondary reaction products, and this tendency is more pronounced when butenes and pentenes are the olefins used than when ethene or propene are the olefin used. The time of contact between the hydrocarbons undergoing alkylation and the alkylation catalyst should be between one second and ten seconds. The precise interval may well vary inversely with the olefin concentration and the temperature. For example, when alkylating butenes with isobutane at a temperature of 75° F. with an olefin content of 2.5 per cent, the maximum reaction time may advantageously be about one second, while this reaction time may be extended to about five seconds when the olefin content is reduced to about 0.5 per cent. The contact time of one to ten seconds herein specified is based on the fresh charge to the system, exclusive of any recycle, and may be defined as the ratio of the volume of voids in the catalyst bed to the volume of such fresh charge introduced into the system per second of time.

I shall now further describe my process in connection with the attached drawing.

The equipment required for practice of my invention is of conventional design, as here described, and it is operated as follows: An olefin or olefin-containing stock is introduced through line 1 to the suction side of a pump 3. Suitable stock for this olefin feed may be ethene, propene, butenes, pentenes, or mixtures of some of these. An isoparaffin or an isoparaffin-containing stream is introduced through line 2 to the suction side of pump 4. Suitable isoparaffins comprise isobutane or isopentane or a mixture thereof. The olefin stream leaving pump 3 through line 5 and the isoparaffin stream leaving pump 4 through line 6 join in line 7 and are conducted thereby to a reactor chamber 8. Reactor chamber 8 is advantageously an open chamber with a supporting grill 20 positioned slightly above the bottom of the chamber. This grill 20 supports a bed of catalyst 21, this bed being initially built up of discrete particles of anhydrous aluminum chloride. In order to reduce the weight on the lowermost particles, the catalyst may be divided between two or more grills 20 placed one above another in reactor 8. The particle size of the aluminum chloride catalyst may vary from a relatively fine granular material up to lumps approximating an inch in diameter, or even more, depending principally upon the size of the chamber, the reaction time and the space velocity desired. The hydrocarbon feed line 7 enters the base of reactor 8 at a point below the catalyst bed, and the line 7 may terminate inside of reactor 8 with some kind of a distributing head if desired.

The mixture of isoparaffins and olefins in its passage upward through the bed of aluminum chloride undergoes an alkylation reaction, thereby producing higher molecular weight isoparaffins. Reaction chamber 8 is constructed with a height greater than that required for the catalyst bed in order that there may be some height of open chamber above the catalyst. This is to permit settling out of fine particles and thereby avoid their carrying over to subsequent portions of the apparatus. The rate of flow of hydrocarbon through the reactor 8 is regulated so that the contact time between the hydrocarbons and catalyst is held within the specified limit of from one to ten seconds, being governed by the volume and particle size of the aluminum chloride bed and the rate of introduction of hydrocarbons.

The reaction products of the alkylation step together with any unreacted materials flow out of the top of the reaction chamber 8 through line 9. The stream leaving chamber 8 through line 9 will contain an appreciable quantity of the isoparaffins introduced through line 7 due to the fact that the content of olefins in line 7 is held to within a range of 0.1 per cent to 2.5 per cent and the additional fact that this proportion of olefins is far below that required for reaction with the large proportion of isoparaffins present. As the amount of alkylate present in line 9 is low in proportion to the percentage of unreacted isoparaffins, it is ordinarily advantageous to recycle much of this material through line 10 and pump 11 and line 12 back into feed line 7.

Either all or a portion of the contents of line 9 are conducted away through line 19 to a fractionating tower 13. Tower 13 is of conventional bubble-tray or packed design and may be equipped with suitable reflux, temperature and pressure control means, not shown.

Fractionating tower 13 is used to remove unreacted isoparaffin feed from the alkylate, and this unreacted isobutane or isopentane goes overhead and is removed through line 14. All or a portion of this stream may be recycled through line 2 for introduction into vessel 8 by means not shown. In addition to the isoparaffin, this stream will also contain any normal paraffins of the same approximate boiling range which may have been present in the feed to chamber 8.

Stripped alkylate is removed from the bottom of fractionator 13 through line 15 and is then conducted to fractionator 16 for final separation into two or more streams of desired boiling range.

Fractionator 16 is of conventional bubble-tray or packed design and may be equipped with suitable reflux and temperature and pressure control means not shown, and it may also be equipped with one or more side stream take-offs if desired. Primary alkylate of the desired boiling range and end point is removed overhead through line 17, and heavy alkylate comprising relatively high boiling material is removed as a bottom product through line 18.

The efficacy of this process and the new results obtained by it are well shown by the following specific examples.

| Example | I | II | III |
|---|---|---|---|
| | With Recycle of Product | With Recycle of Product | Without Recycle of Product |
| Catalyst at Equilibrium | Solid AlCl₃ | Solid AlCl₃ | Solid AlCl₃ |
| Hydrocarbon Feed Mixture Composition, Vol. per cent: | | | |
| Propene | 0.03 | 0.03 | 0.04 |
| Propane | 0.20 | 0.20 | 0.15 |
| Isobutene | 0.01 | 0.01 | 0.02 |
| Isobutane | 75.00 | 75.00 | 97.82 |
| Butene-1 | 0.06 | 0.06 | 0.07 |
| Butene-2 | 0.36 | 0.35 | 0.40 |
| Normal Butane | 5.25 | 5.50 | 1.50 |
| Recycle Alkylate | 19.09 | 18.85 | |
| Total | 100.00 | 100.00 | 100.00 |
| Total Olefins | 0.46 | 0.45 | 0.53 |
| Operating Conditions: | | | |
| Reaction Zone— | | | |
| Temperature, °F | 60 | 60 | 60 |
| Pressure, P. s. i. | 100 | 100 | 100 |
| Reaction Time, Seconds | 96 | 5 | 5 |
| Ratio, Gms. of AlCl₃ per Cc. of Olefins/Hr. | [1] 17 | [1] 3 | [1] 3 |
| Debutanized Rerun Product: | | | |
| Yield— | | | |
| Vol. per cent of Olefin | 150 | 150 | 153 |
| Vol. per cent of Debut. Product | 72 | 88 | 90 |
| Inspection: | | | |
| Octane No., CFR-ASTM Motor Method | 80 | 92 | 94 |
| Distillation, ASTM— | | | |
| Initial B. P., °F | 150 | 140 | 150 |
| 10% at: °F | 188 | 185 | 190 |
| 50% at: °F | 206 | 207 | 205 |
| 90% at: °F | 238 | 234 | 229 |
| Final B. P., °F | 260 | 257 | 241 |

[1] Approx.

An examination of the above specific examples will show many distinctions from the prior art, and it will particularly disclose that the five second reaction time used in Examples II and III, resulted in 88 per cent and 90 per cent yields of 92 and 94 octane alkylates, as compared with a 72 per cent yield of only 80 octane product when operating with the 96 seconds reaction time of Example I. All conditions other than reaction time are maintained substantially alike in the various examples.

Recycling of a portion of a portion of the reactor effluent effects a high dispersion of olefin in the charge stock and is equivalent to providing the reactor with an internal stirring mechanism or an internal circulation system, neither of which is practical with a stationary catalyst bed. The recycling results in a high internal ratio of isoparaffin to olefin and minimizes olefin concentration at any one point within the reactor system. Such a procedure would ordinarily be adopted in commercial operation and was used in the operations reported in specific Examples I and II above.

An important advantage of my process is that it produces a greater proportion of primary alkylation products than is produced by the processes of the prior art. By primary alkylation product I mean the alkylation products which are first formed directly from the original hydrocarbons charged, without extensive subsequent re-arrangement to other compounds.

The primary advantage of my process, as already pointed out, is that it permits the economical use of anhydrous aluminum chloride as a catalyst in the alkylation of hydrocarbons, this being so because it shows the way, for the first time in this art, to indefinitely maintain a permeable bed of hard discrete particles of anhydrous aluminum chloride catalyst, even after the aluminum chloride has undergone reaction with hydrocarbons.

When aluminum chloride is used as a catalyst it is frequently mounted on unreactive carrier materials such as carbon, diatomaceous earth, silica, alumina, magnesia, magnesite, crushed fire brick, aluminum silicates, porcelain, clays, fuller's earth, bentonite, montmorillonite, etc. and other refractory porous substances which have substantially no reactivity with anhydrous aluminum chloride. In the appended claims, when I speak of a catalyst bed made up of discrete particles of anhydrous aluminum chloride unmounted on any unreactive carrier I mean thereby discrete particles of anhydrous aluminum chloride not mounted upon and substantially free of unreactive carrier materials such as those named in this paragraph.

What I claim is:

1. In the alkylation of an olefin with an isoparaffin the process which comprises passing a mixture of hydrocarbons comprising olefins and isoparaffins through a catalyst bed made up of discrete particles of anhydrous aluminum chloride unmounted on any unreactive carrier, maintaining the proportion of olefins in the hydrocarbon feed stock within the approximate range of 0.1 per cent to 2.5 per cent, maintaining the time of contact of hydrocarbon and aluminum chloride within the range of from one second to ten seconds, and maintaining the temperature within the approximate range of 50° to 75° F.

2. In the alkylation of hydrocarbons with the aid of anhydrous aluminum chloride, the process of maintaining a permeable bed made up of anhydrous aluminum chloride catalyst which comprises setting up a permeable bed of discrete particles of anhydrous aluminum chloride unmounted on any unreactive carrier, passing a stream of isoparaffin and olefin hydrocarbons to be alkylated through the bed of aluminum chloride at a temperature within the approximate range of 50° to 75° F. at such a rate of flow that the time of contact of hydrocarbon with catalyst will be not less than one second or more than ten seconds, and maintaining the olefin content of the said hydrocarbon stream being introduced into said permeable bed of anhydrous aluminum chloride within the approximate range of 0.1 per cent to 2.5 per cent.

3. The process of alkylating hydrocarbons which comprises passing a mixture of hydrocarbons comprising olefins and isoparaffins through a catalyst bed made up of discrete particles of anhydrous aluminum chloride unmounted on any unreactive carrier, maintaining the content of olefins in the hydrocarbon feed stock within the approximate range of 0.1 per cent to 2.5 per cent, maintaining the flow of hydrocarbons over the catalyst at such a rate that the time of contact of hydrocarbon with catalyst will be not less than one second and not more than ten seconds, and maintaining the temperature of the hydrocarbons within the approximate range of 50° to 75° F.

LESLIE U. FRANKLIN.

REFERENCES CITED

The following references are of record in the file of this patent:

UNITED STATES PATENTS

| Number | Name | Date |
| --- | --- | --- |
| 2,394,368 | Clarke | Feb. 5, 1946 |
| 2,332,564 | Egloff | Oct. 26, 1943 |
| 2,318,781 | Ipatieff et al. | May 11, 1943 |
| 2,298,383 | Ipatieff et al. | Oct. 13, 1942 |